United States Patent

Neil

(10) Patent No.: US 9,824,550 B2
(45) Date of Patent: Nov. 21, 2017

(54) APPARATUS AND METHOD FOR CONTROLLING INDICATOR LIGHTS IN A DEVICE

(71) Applicant: THOMSON LICENSING, Issy de Moulineaux (FR)

(72) Inventor: Mao Uong Neil, Indianapolis, IN (US)

(73) Assignee: THOMSON Licensing, Issy-les-Moulineaux (FR)

( * ) Notice: Subject to any disclaimer, the term of this patent is extended or adjusted under 35 U.S.C. 154(b) by 36 days.

(21) Appl. No.: 14/406,026

(22) PCT Filed: Apr. 24, 2013

(86) PCT No.: PCT/US2013/037989
§ 371 (c)(1),
(2) Date: Dec. 5, 2014

(87) PCT Pub. No.: WO2013/184243
PCT Pub. Date: Dec. 12, 2013

(65) Prior Publication Data
US 2015/0154836 A1 Jun. 4, 2015

Related U.S. Application Data

(60) Provisional application No. 61/657,093, filed on Jun. 8, 2012.

(51) Int. Cl.
*G08B 21/00* (2006.01)
*G08B 5/36* (2006.01)
(Continued)

(52) U.S. Cl.
CPC ............. *G08B 5/36* (2013.01); *H04N 21/485* (2013.01); *G11B 33/10* (2013.01)

(58) Field of Classification Search
CPC .......... G08B 5/36; H04N 21/485; G11B 33/10
See application file for complete search history.

(56) References Cited

U.S. PATENT DOCUMENTS 5,996,079 A  11/1999  Klein
6,133,844 A  10/2000  Ahne et al.
(Continued)

FOREIGN PATENT DOCUMENTS

CN  101129094  2/2008
FR  2889643  2/2007
(Continued)

OTHER PUBLICATIONS

AVM, Fritz! DSL/WLAN, Installation, Configuration and Operation of Fritz!Box Fon WLAN 7140, 2006.
(Continued)

*Primary Examiner* — Ryan Sherwin
(74) *Attorney, Agent, or Firm* — Brian Dorini; Ivonete Markman

(57) ABSTRACT

An apparatus and method for controlling indicator lights in a device is described. The apparatus includes a first visual indicator that indicates a status of a first activity, a second visual indicator that indicate a status of a second activity, and a control circuit adjusting an intensity for the first visual indicator when the first visual indicator is illuminated in response to the status of the first activity and adjusting an intensity for the second visual indicator when the second visual indicator is illuminated in response to the status of the second activity. The method includes providing a first signal to a first indicator light indicating a status for a first activity, providing a second signal to a second indicator light indicating a status for a second activity, and providing a third signal to the first and second indicator lights that adjusts the brightness of the lights.

30 Claims, 4 Drawing Sheets

(51) Int. Cl.
*H04N 21/485* (2011.01)
*G11B 33/10* (2006.01)

(56) References Cited

U.S. PATENT DOCUMENTS

| | | | |
|---|---|---|---|
| 7,385,495 B2* | 6/2008 | Buhr | H05B 33/0845 |
| | | | 340/321 |
| 7,825,882 B2 | 11/2010 | Wei et al. | |
| 7,843,148 B2* | 11/2010 | Gater | G09G 3/342 |
| | | | 315/291 |
| 8,351,346 B2 | 1/2013 | Itano et al. | |
| 9,198,244 B2* | 11/2015 | Steckel | H05B 33/0815 |
| 9,429,234 B2* | 8/2016 | Ha | F16H 63/42 |
| 9,538,593 B2* | 1/2017 | Zhang | H05B 33/0818 |
| 2006/0214876 A1 | 9/2006 | Jendbro et al. | |
| 2007/0009226 A1 | 1/2007 | Choo | |
| 2010/0020681 A1* | 1/2010 | Nakashima | H04L 12/4625 |
| | | | 370/229 |

FOREIGN PATENT DOCUMENTS

| | | |
|---|---|---|
| JP | A1990247688 | 10/1990 |
| JP | 06077534 | 3/1994 |
| JP | 2005228979 | 8/2005 |
| JP | 2006179619 | 7/2006 |
| JP | 4772150 | 8/2011 |
| WO | WO2008060842 | 5/2008 |

OTHER PUBLICATIONS

WO search report dated Feb. 25, 2013.
Cook, "How to Control LED Brightness with a PWM Circuit", Robot Room, Nov. 6, 2007, retrieved from the Internet on Sep. 16, 2013, 4 pages.

* cited by examiner

APPARATUS AND METHOD FOR CONTROLLING INDICATOR LIGHTS IN A DEVICE

REFERENCE TO RELATED PROVISIONAL APPLICATION

This application claims the benefit, under 35 U.S.C. §365 of International Application PCT/US2013/037989, filed Apr. 24, 2013, which was published in accordance with PCT Article 21(2) on Dec. 12, 2013 in English and which claims the benefit of U.S. provisional patent application No. 61/657,093, filed Jun. 8, 2012.

TECHNICAL FIELD OF THE INVENTION

The present disclosure generally relates to devices that include more than one indicator light for displaying status of an operation or function in the device. More specifically, the present disclosure relates to an apparatus and method for controlling a plurality of indicator lights in the device.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many home entertainment devices not only include the capability to receive and/or process available media content but also include the ability to communicate with other devices in a home network. These devices often include, but are not limited to, set-top boxes, gateways, televisions, home computers, and the like. Further, many of these devices may include multiple interfaces for different types of home networks. These devices may also include additional features internal to the device, such as storage elements, hard drives, compact disk or digital versatile disk drives, and the like.

During operation of a home entertainment device, it may be important to have an indicator of operational or functional status of some of the features of the device, such as but not limited to network communications, memory access, power, recording, and display format. These indicators may include light emitting diodes (LEDs) or other indicators and may be located conveniently for viewing by the user (e.g., on a front panel).

Many home entertainment devices include a controller or processor with capability to control more than one indicator light and, more importantly, may have capability to control the brightness of more than one indicator light. Control of the indicator is often performed using a simple switch implemented in a general purpose input/output (GPIO) circuit. Control of the brightness of each indicator light usually requires the use of a variable voltage or resistance circuit. In some cases, a variable duty cycle controlled output switching circuit, such as a pulse width modulator (PWM) output may also be connected to each indicator light.

Controllers or processors are available that include capability to control more than one indicator light. However, in many cases, the controller may include the capability to control multiple indicators but include no or only one adjustment control for the brightness of the indicator lights. Further, separate brightness control circuits for a plurality of indicator lights may also be available (e.g., digital to analog converters, PWM circuits). However, this approach increases cost as well as complexity. It is also possible to make hardware modifications to change a component value in the circuit for the indicator light to change brightness. However, this approach does not permit dynamic adjustment, such as adjustment during operation of the device that may be needed or desired based on operating environment. A design is needed that allows the brightness of more than one indicator to be more optimally controlled in a low cost home entertainment device,

SUMMARY

According to an aspect of the present disclosure, apparatus for controlling indicator lights is described. The apparatus includes a first visual indicator that indicates a status of a first activity, a second visual indicator that indicate a status of a second activity, and a control circuit coupled to the first visual indicator and the second indicator, the control circuit adjusting an intensity for the first visual indicator when the first visual indicator is illuminated in response to the status of the first activity and adjusting an intensity for the second visual indicator when the second visual indicator is illuminated in response to the status of the second activity.

According to another aspect of the present disclosure, a method for controlling the display of indicator lights in a device is described. The method includes providing a first signal to a first indicator light, the first signal indicating a status for a first activity in a device, providing a second signal to a second indicator light, the second signal indicating a status for a second activity in the device, and providing a third signal to the first indicator light and the second indicator light, the third signal adjusting the brightness of the first indicator light and the second indicator light.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

Figure 1:
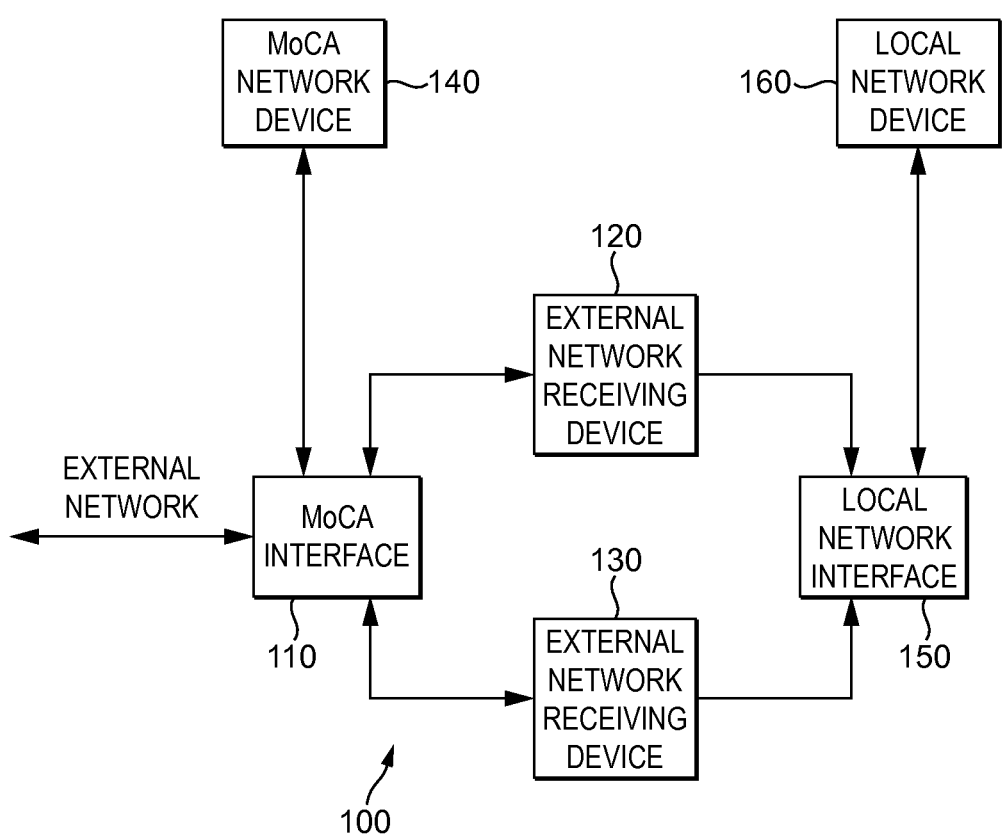
FIG. 1 is a block diagram of an exemplary signal receiving system in accordance with the present disclosure.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/ output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The embodiments of the present disclosure are related to controlling indicator lights in a device, such as a home entertainment device. In particular, the embodiments disclose an apparatus and method for multiplexing the control of indicator lights, such as light emitting diodes (LEDs), used for showing the status of various functions or operations with either common or individual dynamic brightness control for devices having limited available control mechanisms. The apparatus and method include the ability to control or adjust the operation and brightness of the indicator lights and may further include dynamically controlling or adjusting the brightness at any time during operation and use of the device.

The disclosure is directed at the problems related to controlling the operation of indicator lights (e.g., LEDs) in a low cost and efficient manner in a device. The apparatus and method describe controlling operation and/or brightness of multiple indicator lights simultaneously using a shared control circuit for controlling the brightness of the light in a device. Embodiments include using a common PWM control circuit that operates as a digital to analog converter circuit and that is shared between each of the indicator lights, with each light also having a control for determining if the light is active (e.g., on or off). The control mechanism allows independent control of the activity of each light while also allowing common or independent control of the brightness of each light.

Turning now to FIG. 1, a block diagram of an embodiment of a system 100 for providing home entertainment media content in a home, or end user, network is shown. The media content, originating from a content provider, is provided through an external network to a Multimedia over Cable Alliance (MoCA) interface 110. The media content may be provided using any one of the standard transmission protocols and standards for content delivery (e.g., Advanced Television Systems Committee (ATSC) A/53, digital video broadcast (DVB)-Cable (DVB-C), DVB-Satellite (DVB-S), or DVB-Terrestrial (DVB-T)). MoCA interface 110 is connected to external network receiving device 120, external network receiving device 130, and MoCA network device 140. Both external network receiving device 120 and external network receiving device 130 connect to local network interface 150. Local network interface 150 connects to local network device 160. The components shown in system 100 comprise a home network configured to provide media content to multiple locations within the home using one or more home communication networks.

A signal containing media content (e.g., audio, video, and/or data) from the external network is provided over a physical media, such as co-axial cable. The external network interfaces to MoCA interface 110. MoCA interface 110 provides a routing mechanism for the signal from the external network to devices in the home or user network (e.g., external network receiving device 120 and external network receiving device 130) in conjunction with signals that operate in the MoCA network with the home or user network. Moca interface 110 may include active or passive circuit elements that may split or separate the input signal into different or similar output signals. Moca interface 110 may use amplifiers, frequency filters, and electromagnetic circuits to split or separate the signal. In one embodiment, the external network provides a signal on a co-axial cable between the frequency range of 20 Megahertz (MHz) and 800 MHz. The MoCA network operates using signals in the frequency range from 950 MHz to 1,250 MHz. In an alternative embodiment, the external network provides a signal between the frequency range of 950 MHz and 2,150 MHz with the MoCA network operating in the frequency range of 425 MHz to 625 MHz. MoCA interface 110 provides a signal splitting for signals from the external network and a separate signal splitting for signals on the MoCA network while preventing signals from the MoCA network from being output to the external network.

External network receiving device 120 and external network receiving device 130 may each operate and function in a similar manner. External network receiving device 120 and external network receiving device 130 receive the signal from the external network through the MoCA interface 110. External network receiving device 120 and external network receiving device 130 may receive different types of media content (e.g., different channels) from either the external network or from other devices in the home network through either MoCA interface 110 or local network interface 150. External network receiving devices 120 and 130 tune, demodulate, decode, and process the received content and provide the content for display and use by a user in the home. External network receiving devices 120 and 130 may further provide a separation of the media content based on instructions provided with the content or over the external network. External network receiving devices 120 and 130 may also process and separate media content based on instructions received via user commands. External network receiving devices 120 and 130 may also provide storage, such as a hard drive or optical disk drive, for recording and/or storing the media content as well as providing the content for playback to other devices in a home network (e.g., MoCA network device 140 and local network device 160). The operation and function of an external network receiving device, such as discussed here, will be described in further detail below. External network receiving devices 120 and 130 may be one of a set top box, home media server, computer media station, home network gateway, multimedia player, modem, router, home network appliance, or the like.

External network receiving devices 120 and 130 provide interfaces for communicating signals on the MoCA network through MoCA interface 110 to and from other MoCA network devices (e.g., external network receiving devices 120 and 130 and MoCA network device 140). External network receiving devices 120 and 130 also provide interfaces to a local home network through local network interface 150 to local network device 160. In one embodiment, the local network is an Ethernet network. In addition, the local network may be a wireless network. Wireless communication using a wireless network may include physical interfaces to accommodate one or more wireless formats including Wi-Fi, Institute of Electrical and Electronics Engineers standard IEEE 802.11 or other similar wireless communications protocols.

MoCA interface 110 provides MoCA network signals between external network receiving device 120, external network receiving device 130, and MoCA network device 140. MoCA network device 140 tunes, demodulates, and decodes MoCA signals for display and use by a user. MoCA network device 140 may also transmit or communicate signals on the MoCA network for delivery to other devices (e.g., external network receiving device 120 or 130). These signals may provide control or identification information for media content to be delivered to the MoCA network device 140. The MoCA network device 140 is often referred to a thin client MoCA device and may be, but is not limited to, a settop box, setback box, computer device, tablet, display device, television, wireless phone, personal digital assistant (PDA), gaming platform, remote control, multi-media player, or home networking appliance that includes a MoCA interface, and may further include a storage media for digital video recording. MoCA network device 140 may also include a storage device, such as a hard drive or optical disk drive, for recording and playing back audio and video content.

Local network interface 150 provides the routing and signal communication and management functions between devices communicating across the local network. In one embodiment, local network interface 150 operates as a signal router for communicating using internet protocol routing protocols as part of an Ethernet network.

Local network interface 150 provides local network signals between external network receiving device 120, external network receiving device 130, and local network device 160. Local network device 160 also may tune, demodulate, and/or decode the local network signals for display and use by a user depending on the communication protocol used. Local network device 160 may also transmit or communicate signals on the local network for delivery to other devices (e.g., external network receiving device 120 or 130). These signals may provide control or identification information for media content to be delivered to the local network device 160. The local network device 160 is often referred to a thin client device and may be, but is not limited to, a computer device, tablet, display device, television, wireless phone, personal digital assistant (PDA), gaming platform, remote control, multi-media player, or home networking appliance that includes a local network interface. Local network device 160 may further include a storage media for digital media recording.

It is important to note that any of external network receiving devices 120 and 130, MoCA network device 140, and local network device 160 may include display capability or may be connected to one or more display devices, not shown. The display devices may be conventional two-dimensional (2-D) type displays or may alternatively be advanced three-dimensional (3-D) type displays. It should be appreciated that other devices having display capabilities including, but not limited to, computer devices, tablets, gateways, display devices, televisions, wireless phones, PDAs, computers, gaming platforms, remote controls, multi-media players, home networking appliances or the like, may employ the teachings of the present disclosure and are considered within the scope of the present disclosure.

In operation, system 100 provides the networking and communication capability for connecting and sharing media content between devices in a user's home using either the MoCA network or the local network or both networks. In one embodiment, media content for a particular program is tuned by external network receiving device 120 and provided to MoCA network device 140 through MoCA interface 110. External receiving device 130 may also receive a second program provided by the external network and record the program to a recording media. At another point in time, the user of local network device 160 desires to view the second program and requests the program over the local network through local network interface 150. External network receiving device 130 responds to the request and provides the second program to local network device 160 through local network interface 150. Each of external network receiving device 120, external network receiving device 130, MoCA network device 140, and local network device 160 may include more than indicator light showing the status of one or more of the current functions and operations being performed. Other embodiments related to the sharing and distribution of media content in a home network using more than one physical communication network are also possible.

It should be appreciated by one skilled in the art that system 100 in FIG. 1 is described primarily as operating with a local MoCA network and a second local network, such as an Ethernet network. However, other network standards that incorporate either a wired or wireless physical interface may be used. For instance, the second local network may be wireless network using WiFi, Bluetooth, or IEEE 802.11. Other wired networks, such as phone line or power line networks, may be used in place of the MoCA network. Further, more than two networks may be used either alternatively or simultaneously together.

Figure 2:
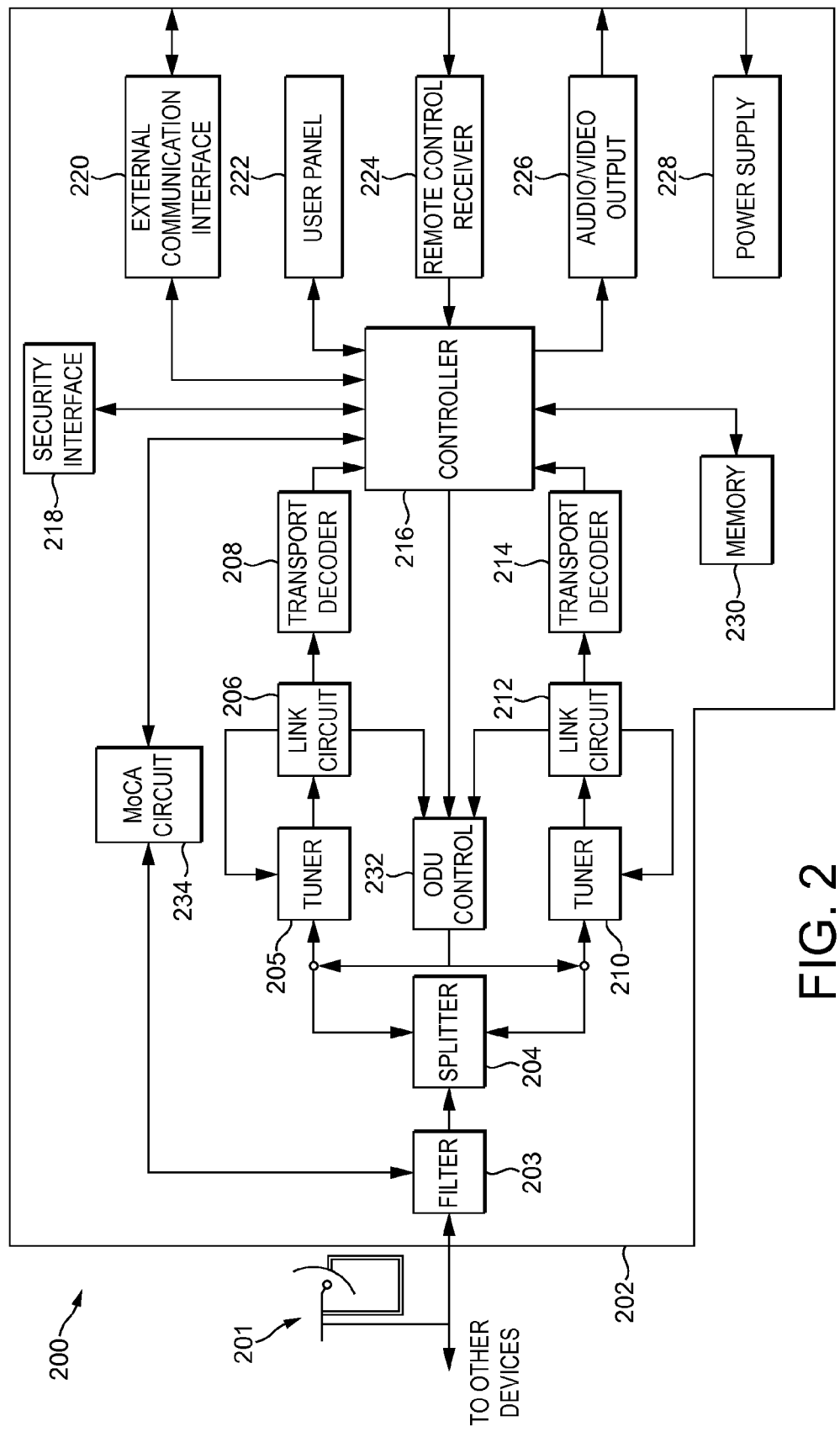
FIG. 2 is a block diagram of an exemplary signal receiving device in accordance with the present disclosure.

Turning now to FIG. 2, a block diagram of an exemplary embodiment of a signal receiving device 200 using aspects of the present invention is shown. Signal receiving device 200 operates in a manner similar to external network receiving device 120 and external network receiving device 130 described in FIG. 1. Signal receiving device 200 primarily receives signals from one or more satellites. The signals are provided by a service provider and represent broadcast audio and video programs and content. Signal receiving device 200 is described as including components that reside both inside and outside a user's premises. It is important to note that one or more components in signal receiving device 200 may be moved from inside to outside the premises. Further, one or more components may be integrated with a display device, such as a television or display monitor (not shown). In either case, several components and interconnections necessary for complete operation of signal receiving device 200 are not shown in the interest of conciseness, as the components not shown are well known to those skilled in the art.

An outdoor unit (ODU) 201 receives signals from the satellite through an over the air near earth orbit communications link. ODU 201 is connected to set top box 202. Within set top box 202, the input is connected to filter 203. Filter 203 connects to splitter 204. Splitter 204 connects to two signal processing paths. A first path includes tuner 205, link circuit 206, and transport decoder 208 connected together serially. A second path includes tuner 210, link circuit 212, and transport decoder 214 connected together serially. The outputs of transport decoder 208 and transport decoder 214 each connect to controller 216. Controller 216 connects to security interface 218, external communication interface 220, user panel 222, remote control receiver 224, audio/video output 226, power supply 228, memory 230, and ODU control 232. External communication interface 220, remote control receiver 224, audio/video output 226, and power supply 228 provide external interfaces for the set top box 202. ODU control 232 also connects to the splitter 203. Filter 203 also connects to MoCA circuit 234. MoCA circuit 234 further connects to controller 216.

Satellite signal streams, each containing a plurality of channels, are received by ODU 201. ODU 201 includes a dish for capturing and focusing the propagated radio wave from the atmosphere onto one or more antennas contained within a structure known as a low noise block converter (LNB). ODU 201 may be configured to receive the signal streams from satellite transponders located on one or more satellites. In a preferred embodiment, two sets of sixteen channels are received by ODU 201, and converted, using one or more LNBs to a frequency range of 950 MHz to 2,150 MHz, referred to as L-band.

ODU 201 provides a converted signal stream to the set top box 202 through RF co-axial cable. The converted signal stream is provided to filter 203. The frequency response properties of filter 203 include a separate high pass filter and low pass filter such that the frequency pass bands of each do not overlap. The arrangement, often referred to as a diplexer, allows for a separation, through signal filtering, of the incoming satellite signal from the MoCA signal. In a preferred embodiment, the low pass filter frequency response pass band ends at a frequency below 900 MHz. The low pass filter allows a MoCA signal in a frequency range from 475 MHz to 625 MHz to pass through to subsequent blocks while attenuating, or not passing through, a satellite signal in a frequency range from 950 MHz to 2,150 MHz. High pass filter 220 operates in an opposite manner passing the satellite signal through and attenuating the SWM signal and MoCA signal.

The output signal from the high pass filter portion of filter 203 is provided to splitter 204. Splitter 204 splits, or divides, the incoming converted signal stream into two separate signal streams. Splitter 204 operates on the converted signal streams at radio frequencies and must provide a splitting of the signal power that is present at the input of splitter 204. Splitter 204 also maintains proper input and output operating impedances across the entire range of operating frequencies. In one embodiment, splitter 204 splits the converted signal stream into two signal streams having between three decibels (dB) and five dB of signal insertion loss and having an operating impedance of 75 ohms at the input and both outputs.

Each of the separate split signal streams from splitter 204 is processed in a separate signal processing path. The upper signal path contains a tuner 205, a link circuit 206, and a transport decoder 208 with the signal path connected in a serial fashion. The lower path also contains a tuner 210, a link circuit 212, and a transport decoder 214 with the signal path also connected in a serial fashion. Each processing path may perform essentially identical signal processing on one of the split signal streams. Therefore only the upper signal processing path will be further described here.

The upper split signal stream from splitter 204 is provided to tuner 205. Tuner 205 processes the split signal stream by selecting or tuning one of the channels in the split signal stream to produce one or more baseband signals. Tuner 205 contains circuits (e.g., amplifiers, filters, mixers, and oscillators) for amplifying, filtering and frequency converting the split signal stream. Tuner 205 typically is controlled or adjusted by link circuit 206. Alternately, tuner 205 may be controlled by another circuit element, such as controller 216, which will be described later. The control commands include commands for changing the frequency of an oscillator used with a mixer in tuner 205 to perform the frequency conversion.

Typically the baseband signals at the output of tuner 205 may collectively be referred to as the desired received signal and represent one satellite channel selected out of a group of channels that were received as the input signal stream. Although the signal is described as a baseband signal, this signal may actually be positioned at a frequency that is only near to baseband.

The one or more baseband signals from tuner 205 are provided to link circuit 206. Link circuit 206 typically contains the processing circuits needed to convert the one or more baseband signals into a digital signal for demodulation by the remaining circuitry of link circuit 206. In one embodiment the digital signal may represent a digital version of the one or more baseband signals. In another embodiment the digital signal may represent the vector form of the one or more baseband signals. Link circuit 206 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS).

The transport signal is provided to transport decoder 208. Transport decoder 208 typically separates the transport signal, which is provided as either a SPTS or MPTS, into individual program streams and control signals. Transport decoder 208 also decodes the program streams, and creates audio and video signals from these decoded program streams. In one embodiment, transport decoder 208 is directed by user inputs or through a controller such as controller 216 to decode only the one program stream that has been selected by a user and create only one audio and video signal corresponding to this one decoded program stream. In another embodiment, transport decoder 208 may be directed to decode all of the available program streams and then create one more audio and video signals depending on user request.

The audio and video signals, along with any necessary control signals, from both transport decoder 208 and transport decoder 214 are provided to controller 216. Controller 216 manages the routing and interfacing of the audio, video, and control signals and, further, controls various functions within set top box 202. For example, the audio and video signals from transport decoder 208 may be routed through controller 216 to an audio/video (A/V) output 226. A/V output 226 supplies the audio and video signals from set top box 202 for use by external devices (e.g., televisions, display monitors, and computers). Also, the audio and video signals from transport decoder 214 may be routed through controller 216 to memory block 230 for recording and storage. Memory block 230 may contain several forms of memory including one or more large capacity integrated electronic memories, such as static random access memory (SRAM), dynamic RAM (DRAM), or hard storage media, such as a hard disk drive or an interchangeable optical disk storage system (e.g., compact disk drive or digital video disk drive). Memory block 230 may include a memory section for storage of instructions and data used by controller 216 as well as a memory section for audio and video signal storage. Controller 216 may also allow storage of signals in memory block 230 in an alternate form (e.g., an MPTS or SPTS from transport decoder 208 or transport decoder 214).

Controller 216 is also connected to an external communications interface 220. External communication interface 220 may provide signals for establishing billing and use of the service provider content. External communications interface 220 may include a phone modem for providing phone connection to a service provider. External communications interface 220 also includes an interface for connection to an additional local network (e.g., Ethernet network). The local network may be used for communication data, audio, and/or video signals and content to and from other devices connected to the Ethernet network (e.g., other media devices in a home).

Controller 216 also connects to a security interface 218 for communicating signals that manage and authorize use of the audio/video signals and for preventing unauthorized use. Security interface 218 may include a removable security device, such as a smart card. User control is accomplished through user panel 222, for providing a direct input of user commands to control the set top box and remote control receiver 224, for receiving commands from an external remote control device. User panel 222 may include a plurality of indicator lights for displaying the status of the functions and operations performed by signal receiving device 200. In one embodiment, user panel 222 may include an indicator for recording, network status, display resolution, and power.

Although not shown, controller 216 may also connect to the tuners 205, 210, link circuits 206, 212, and transport decoders 208, 214 to provide initialization and set-up information in addition to passing control information between the blocks. Finally, power supply 228 typically connects to all of the blocks in set top box 202 and supplies the power to those blocks as well as providing power to any of the elements needing power externally, such as the ODU 201.

Controller 216 also controls ODU control 232. ODU control 232 provides the signaling and power supply signals back to the ODU 201 by providing these signals onto the co-axial cable(s) running between ODU 201 and set top box 202. In one embodiment, the ODU control 232 receives input control signals from controller 216 and provides different DC voltage levels to specific portions of the ODU 201 to provide a certain signal stream containing a set of programs or content to splitter 203 and further to tuner 205 and tuner 210. In another embodiment, the ODU control 232 receives inputs from controller 216 and also from link circuit 206 and link circuit 212 and provides DC voltage levels and a separate tuning control signal to ODU 201 using low frequency carrier based frequency shift keying modulation. Controller 216 also may send control commands to disable ODU controller 230 from providing either direct current (DC) voltages or control signals to ODU 201.

MoCA circuit 234 amplifies and processes the MoCA signal both for reception and transmission. As described above, the MoCA interface permits communications of audio and video signals in a home network and may operate bi-directionally. MoCA circuit 234 includes a low noise amplifier for improving reception performance of a MoCA signal received by signal receiving device 200 from another network connected device. The received and amplified signal is tuned, demodulated, and decoded. The decoded signal may be provided to a number of other circuits, including audio and video outputs as well as a mass storage device (e.g., hard disk drive, optical drive, and the like), not shown. Additionally, MoCA circuit 234 generates and formats the MoCA transmit signal using audio and video content available in signal receiving device, including content received from the input (e.g., satellite signal) and content from the mass storage device. MoCA circuit 234 also includes a power amplifier for increasing the transmitted signal level of the MoCA signal sent by signal receiving device 200 to another network connected device. Adjustment of the receive signal amplification as well as the transmit signal amplification in MoCA circuit 234 may be controlled by controller 216.

It should be appreciated by one skilled in the art that the blocks described inside set top box 202 have important interrelations, and some blocks may be combined and/or rearranged and still provide the same basic overall functionality. For example, transport decoder 208 and transport decoder 214 may be combined and further integrated along with some or all of the functions of controller 216 into a System on a Chip (SoC) that operates as the main controller for set top box 202. Further, control of various functions may be distributed or allocated based on specific design applications and requirements. As an example, the processing paths for the two input signal streams may operate for specific types of signals. Tuner 205, link circuit 206, and transport decoder 208 may receive, demodulate, and decode satellite signals containing content in high definition audio and video formats while tuner 210, link circuit 212, and transport decoder 214 may receive, demodulate, and decode signals containing data for maintaining the operation of a program guide.

Although set top box 202 is described above as receiving a single converted signal stream, set top box 202 may also be configured to receive two or more separate converted signal streams supplied by ODU 201 in some modes of operation. Operation in these modes may include additional components including switches and/or further tuning and signal receiving components, not shown.

Signal receiving device 200 may operate in one or more modes. The functional and operational status for signal receiving device 200 may be provided using one or more status indicator lights included as part of user panel 222. For example, an indicator light may be activated or illuminated when the signal receiving device 200 is recording content. The same indicator light is inactivated or not illuminated when recording is not occurring. Another indicator light may be used to indicate that the video display resolution of the signal provided to the display device is a high definition video display resolution.

Indicator lights may also be used in a device, such as signal receiving device 200, to indicate operation in one or more communication networks. Indicator lights may be activated or illuminated to show that signal receiving device 200 is communicating with another device over a network. For instance, status registers in controller 216 may operate in conjunction with external communication interface 220 to identify Ethernet link activity status. Separate status registers in controller 216 may operate in conjunction with MoCA circuit 234 to identify MoCA link and MoCA activity status. Controller 216 may then control illumination of one or more indicator lights for MoCA and/or Ethernet communication status.

Each of the indicator lights in user panel 222 in signal receiving device 200 may be individually controlled based on a control status signal provided through controller 216. Further each indicator light may have a brightness level that is controlled through a brightness control that permits either a common brightness level or a different brightness level for each indicator light. Aspects of the circuit and control of the brightness of the indicator lights will be described in further detail below.

Figure 3:
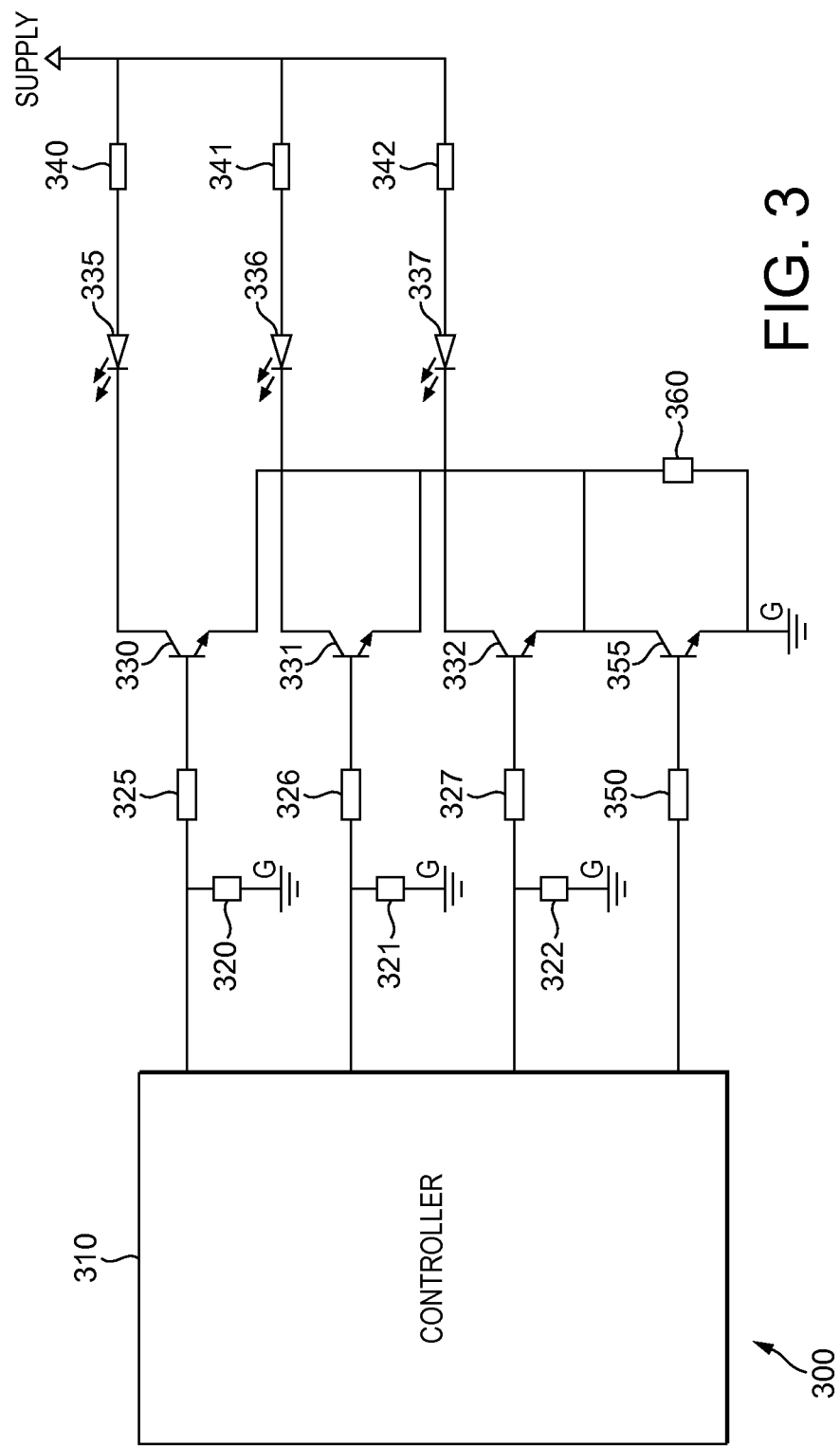
FIG. 3 is a block diagram of an exemplary indicator light control circuit in a signal receiving device in accordance with the present disclosure.

Turning to FIG. 3, an exemplary embodiment of an indicator light control circuit 300 used in a device according to aspects of the present disclosure is shown. Indicator light control circuit 300 may be included in a signal receiving device, such as set top box 202 described in FIG. 2. Indicator light control circuit 300 may also be used in other devices, such as external network receiving device 120, external network receiving device 130, MoCA network device 140 or local network device 160 described in FIG. 1. Several components and interconnections necessary for complete operation of indicator light control circuit 300 are not shown in the interest of conciseness, as the components not shown are well known to those skilled in the art.

Indicator light control circuit 300 includes a controller 310 that connects to a common connection node including three pairs of circuit elements 320 and 325, 321 and 326, and 322 and 327. Circuit elements 320, 321, and 322 further connect to ground. Circuit elements 325, 326, and 327 further connect to base inputs of transistors 330, 331, and 332 respectively. The upper terminals of transistors 330, 331, and 332 connect to the cathodes of LEDs 335, 336, and 337 respectively. The anodes of LEDs 335, 336, and 337 connect to circuit elements 340, 341, and 342 respectively. The circuit elements 340, 341, and 342 further connect to a direct current power supply circuit (not shown). The lower terminals of transistors 330, 331, and 332 all connect to the upper terminal of transistor 355 and also to circuit element 360. The lower terminal of transistor 355 connects to ground. Circuit element 360 also further connects to ground. Controller 310 also connects to circuit elements 350 which further connect to the base input of transistor 355.

Controller 310 may operate in a manner similar to controller 216 described in FIG. 2. Controller 310 includes three general purpose input/output connections configured to operate as outputs to drive either a high level voltage (e.g., 1.8 volts) or low voltage (e.g., 0 volts) to common connection nodes for circuit elements 320 and 325, 321 and 326, and 322 and 327. The output signals from controller 310, through circuit elements 320 and 325, 321 and 326, and 322 and 327, drive either a potential current conducting or non-conducting steady state in transistors 330, 331, and 332.

Controller 310 also includes one clocked PWM output operating between two voltage levels (e.g., 1.8 volts and 0 volts) that is provided to circuit element 350. The PWM output, through circuit element 350, controls the current conducting or non conducting state in transistor 355. The PWM output may vary the time difference for high voltage versus low voltage level for each clock period used in controller 310. The varying pulse width may be used to vary the time that transistor 335 is in the conducting state. The clock rate for the PWM should be a rate fast enough to control the brightness of the light without resulting in flicker. However, a rate that is too fast may prevent control of the brightness due to visual persistence of the light. In one embodiment, a clock rate of 200 kilohertz (kHz) for the PWM circuit that is programmable using 8 bits (i.e., 256 levels) may be generated in controller 310 operating at a master clock rate of 54 Megahertz (MHz).

The series connection of transistors 330, 331, and 332 and transistor 355 provide two control mechanisms for current conduction. In current conduction mode, current flows from the supply circuit through circuit element 340 and LED 335, circuit element 341 and LED 336, and/or circuit element 342 and LED 337. As a result, light will be emitted from one or more LED 335, LED 336, and LED 337. The general purpose input/output connections control whether current flows through one or more LEDs 335, 336, and 337. The PWM output is connected to transistor circuit 355 which is in series with each one of transistors 330, 331, and 332 and acts as a variable resistance circuit controlling the effective or average current through the transistors 330, 331, and 332 and ultimately through the LEDs 335, 336, and 337. The PWM output, through control from controller 310, controls how long the current flows during a time period. In other words, the PWM output controls the effective or average current, using programmable on/off pulses having a variable duty cycle, ultimately controlling the light intensity or brightness of one or more LEDs 335, 336, and 337. LEDs 335, 336, and 337 may be a part of a user interface, such as user panel 222 described in FIG. 2.

Controller 310 receives information and operational status from other circuits in the device, such as the transport decoders 208 and 214, external communication interface 220, memory 230, power supply 228, and MoCA circuit 234 described in FIG. 2 to determine the control signals for each of the general purpose input/output connections. Controller 310 may further use some of this information to develop the proper output state for the PWM circuit as well. Additionally, control information for the PWM circuit may be predetermined and stored in a memory, such as memory 230 described in FIG. 2. The information may be stored for each LED 335, 336, and 337 and further may be stored based on which function or operation each LED 335, 336, and 337 is to represent. The information may then be retrieved by controller 310 and used in conjunction with the other information received from the other circuits.

The arrangement of elements described for indicator light control circuit 300 represent one preferred embodiment for controlling indicator lights in a device. Table 1 shows an exemplary set of element values for the preferred embodiment.

TABLE 1

| ELEMENT | VALUE |
| --- | --- |
| 320 | 4700 ohms |
| 321 | 4700 ohms |
| 322 | 4700 ohms |
| 325 | 470 ohms |
| 326 | 470 ohms |
| 327 | 470 ohms |
| 330 | PMBT3904 |
| 331 | PMBT3904 |
| 332 | PMBT3904 |
| 335 | LTST-C190KGKT |
| 336 | LTST-C190KGKT |
| 337 | LTST-C190KGKT |
| 340 | 180 ohms |
| 341 | 180 ohms |
| 342 | 180 ohms |
| 350 | 470 ohms |
| 355 | PMBT3904 |
| 360 | 0 ohms or not used |

In one operation, any LED 335, 336, and 337 may be on or off at any time depending on the status of the operation represented by LEDs 335, 336, and 337. Inputs for the status may be provided to controller 310 from any of the circuit elements contained within a set top box or home entertainment device. Control of the brightness for LEDs 335, 336, and 337 may be a function of the duty cycle, or ratio of high voltage level to low voltage level, and the clock rate for the PWM circuit. The brightness level will be lower when the duty cycle is small and will be higher when the duty cycle is large. The brightness for all LEDs 335, 336, and 337 may be controlled in common by a programmed value in a register in controller 310. The value may be preprogrammed or alternatively may be adjustable, such as by the user. In this operating mode, the brightness for all LEDs 335, 336, and 337, when on, will be the same.

In an alternate embodiment, the brightness for each LED 335, 336, and 337 may be independently controlled. In this embodiment, a separate brightness control value for each LED 335, 336, and 337 may be programmed and/or stored in a register in controller 310 or in a memory circuit, such as memory 230 described in FIG. 2. The separate PWM values permit the brightness to be adjusted for each LED 335, 336, and 337 individually. When controller 310 provides a signal any one of LEDs 335, 336, and 337 to illuminate and indicate a status for a function or operation, controller 310 also retrieves the current PWM value for the LED (e.g., LED 335, 336, or 337) and uses that value conjunction with turning on the LED. In general, more than one LED may be effectively on at the same time. Controller 310 may multiplex the control for LEDs 335, 336, and 337 by sequentially outputting a signal on one of the general purpose input/output connections and outputting a PWM value corresponding to that operation or function during that time period.

In another alternative embodiment, dynamic adjustment of the brightness level for any or all of the LEDs 335, 336, and 337 may be provided. For instance, the brightness may be changed as a result of the time of day, the device being on or off, the user's current program viewing, receiving caller identification or a phone message, the receipt of an email message, or other personal settings available on the device. The brightness may be dynamically adjusted to minimize awareness of any or all of the LEDs 335, 336, and 337 by a user in order to minimize distraction to other activities by the user. Alternatively, the brightness may be dynamically adjusted to draw attention to any or all of the LEDs 335, 336, and 337 and away from the other activities by the user. The brightness control may be performed by storing more than one PWM value in registers in controller 310 or in a memory circuit, such as memory 230 described in FIG. 2. The controller 310 may determine the current operating environment or operating condition and select the PWM value based on this operating environment or condition.

Control of the brightness or illumination of light indicators, such as LEDs 335, 336, and 337, based on the functional or operational status of a device may be performed using one or more methods or processes implemented in hardware, software, or some combination of both. These processes may include selection of modes include indicating recording status, power status, or display resolution. The modes may also indicate communication status for one of the networks or for selecting one of the networks based on the current use of that network. A user interface may be used to select which modes use the indicator lights. A user may make the selections through a menu displayed on the device or provided from the device and displayed on a video display device. Further, the menu may allow selection of a brightness level for any or all of the indicator lights based on one or more operating parameters such as the operating conditions described earlier.

Figure 4:
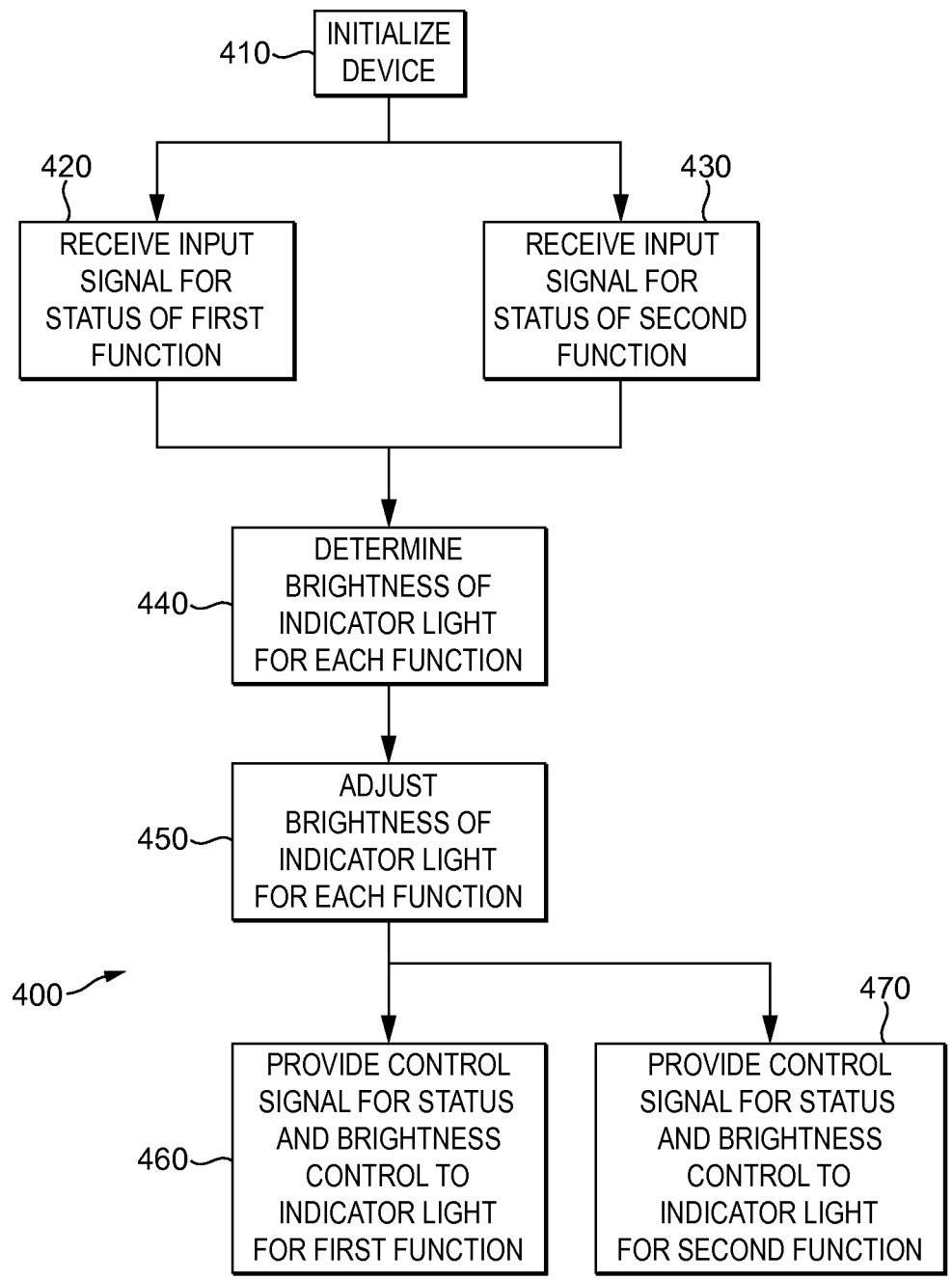
FIG. 4 is a flowchart of an exemplary process for controlling indicator lights in a device in accordance with the present disclosure.

Turning now to FIG. 4, a flowchart of an exemplary process 400 for controlling indicator lights in a device in accordance with the present disclosure is shown. Process 400 will primarily be described with respect to indicator light control circuit 300 described in FIG. 3. The steps of process 400 may equally apply to the signal receiving device 200 in FIG. 2. Additionally, one or more of the steps in process 400 may be equally applicable to external network receiving device 120, external network receiving device 130, MoCA network device 140 or local network device 160 in FIG. 1. Further, it is important to note that some of the steps described in process 400 may be implemented more than once, or may be implemented recursively. Such modifications may be made without any effect to the overall aspects of process 400.

At step 410, the device is initialized. Initialization of the device, at step 410, may include establishing links between a status for one or more operational or functional modes in the device and one or more indicator lights in a user panel on the device. The links may be predetermined, such as during initial manufacturing. Alternatively, the links may be established by a user through a user interface.

At step 420, the controller circuit in the device receives an input for the status of a first operation or function in the device. Also, at step 430, the controller circuit in the device receives an input for the status of a second operation or function in the device. In one embodiment, a controller circuit, such as controller 310, receives information and operational status from other circuits in the device to determine the control signals for each of the general purpose input/output connections. The other circuits in the device may be, for instance, the transport decoders 208 and 214, external communication interface 220, memory 230, power supply 228, and MoCA circuit 234 described in FIG. 2.

Further, at step 430 and step 430, the controller circuit generates controls signals to be used for illuminating indicator lights. It is important to note that the first operation, in step 420, and second operation, at step 430 may be recording content status, power status, video display resolution, network communication status, or any other operation or function associated with the device. It is also important to note that steps 420 and 430 may occur concurrently or at separate times.

At step 440, a brightness level is determined for the indicator lights used to display the status for the first and second operation or function. The brightness may be controlled as a function of the duty cycle, or ratio of high voltage level (e.g., 1.8 volts) to low voltage level (e.g., 0 volts), and the clock rate for a PWM circuit. The indicator lights will be brighter as the duty cycle is increased. Further, the brightness level may be the same or may be different for each indicator light. In some embodiments, both the control signal and the brightness for each indicator light may be separately controlled. In one embodiment, the brightness for each LED 335, 336, and 337 may be independently controlled using only one PWM circuit as a single brightness control element.

To accomplish independent control using a single brightness control circuit, a separate brightness control value for each LED 335, 336, and 337 may be programmed and/or stored in a register in controller 310 or in a memory circuit, such as memory 230 described in FIG. 2. The separate PWM values permit the brightness to be adjusted for each LED 335, 336, and 337 individually. When the controller 310 provides a signal to LEDs 335, 336, and 337 to illuminate and indicate a status for a function or operation (e.g., through generating a control signal from step 420 or step 430), controller 310 also retrieves the current PWM value for the one LED and uses that value in conjunction with turning on the LED (e.g., LED 335, 336, or 337). Controller 310 may multiplex the control for LEDs 335, 336, and 337 by sequentially outputting a signal on one of the general purpose input/output connections and outputting a PWM value corresponding to that operation or function during that time period allowing more than one LED to be effectively illuminated at the same time. A design that can independently control the brightness level of multiple LEDs using a single brightness control circuit (e.g., PWM circuit) results in a simpler and lower cost design for the device or product.

At step 450, the brightness may be further adjusted if necessary. For instance, dynamic adjustment of the brightness level for any or all LEDs 335, 336, and 337 may be provided. The brightness may be changed as a result of the time of day, the device being on or off, the user's current program viewing, receiving caller identification or a phone message, the receipt of an email message, or other personal settings available on the device. The dynamic adjustment of the brightness may permit optimization, either automatically or by user preference, for viewing or recognizing the indicator status for the LEDs 335, 336, and 337 in any room lighting setting or environment. The dynamic adjustment of the brightness may alternatively be done to minimize interference with the user viewing a media program on a display. For example, the brightness level may be low when a user is watching a media program at night in a room with low light level. The brightness level may be increased when an email message is unread in the user's emailbox. In other words, dynamic brightness may be used either to minimize interference with the user's other activity or alternatively to draw attention to the indicator lights and away from the user's other activity. The further adjustment of the brightness, at step 450, may be performed by storing one or more preset brightness level, or PWM output values, in registers in the controller 310 or in a memory circuit, such as memory 230 described in FIG. 2. The controller 310 may then determine the current operating environment and select the final brightness or PWM value based on this operating environment.

At step 460, the control signal for status and the brightness control signal are provided to the first indicator light. Also, at step 470, the control signal for status and the brightness control signal are provided to the second indicator light. In one embodiment, the control signals from controller 310 are output to one or more transistors 330, 331, and 332 as part of controlling LEDs 335, 336, and 337. The PWM output is connected to transistor circuit 355 which is in series with each one of transistors 330, 331, and 332 and acts as a variable resistance circuit. The variable resistance circuit formed with the control signals from controller 310 and transistors 330, 331, 332, and 355 ultimately controls the light intensity or brightness for one or more LEDs 335, 336, and 337. It is also important to note that steps 460 and 470 may occur concurrently or at separate times.

The present disclosure describes embodiments for controlling indicator lights in a device, such as a home entertainment device. In particular, the embodiments describe an apparatus and method for multiplexing the control of light indicators with either common or individual dynamic brightness control for devices having limited available control capability. The embodiments may further include the ability to control or adjust the LED indicators dynamically based on user inputs or at any time during operation and use of the device.

Although embodiments which incorporate the teachings of the present disclosure have been shown and described in detail herein, those skilled in the art can readily devise many other varied embodiments that still incorporate these teachings. Having described preferred embodiments of a method and apparatus for managing a media content database on a device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. An apparatus comprising:
   a first visual indicator that indicates a status of a first activity;
   a second visual indicator that indicate a status of a second activity; and
   a control circuit coupled to the first visual indicator and the second visual indicator, the control circuit adjusting an illumination intensity for the first visual indicator when the first visual indicator is illuminated in response to the status of the first activity and adjusting an illumination intensity for the second visual indicator when the second visual indicator is illuminated in response to the status of the second activity, wherein the control circuit adjusts the illumination intensity for the first visual indicator using one pulse width modulation signal and a first resistor and adjusts the illumination intensity for the second visual indicator using the same one pulse width modulation signal and a second resistor, said one pulse width modulation signal provided to the first visual indicator and the second visual indicator simultaneously and in parallel.

2. The apparatus of claim 1, wherein the control circuit adjusts the illumination intensity for the first visual indicator and the illumination intensity for the second visual indicator based on a value selected by a user.

3. The apparatus of claim 1, wherein the control circuit adjusts the illumination intensity for the first visual indicator and the illumination intensity for the second visual indicator based on a current operating condition for the apparatus.

4. The apparatus of claim 1, wherein the control circuit further adjusts the illumination intensity for the first visual indicator and the illumination intensity for the second visual indicator based on at least one of the time of day, a current program being viewed by a user, receipt of a message on the apparatus, and whether the apparatus is on or off.

5. The apparatus of claim 4, wherein the further adjusting of illumination intensity for the first visual indicator and the illumination intensity for the second visual indicator is done to minimize awareness of at least one of the first visual indicator and the second visual indicator by a user or alternatively to draw attention to the first visual indicator and the second visual indicator by the user.

6. The apparatus of claim 1, wherein the control circuit further determines whether the first visual indicator is illuminated by changing a signal level between a voltage level greater than zero volts and a voltage level equal to zero volts and determines whether the second visual indicator is illuminated by changing a signal level between a voltage level greater than zero volts and a voltage level equal to zero volts.

7. The apparatus of claim 1 wherein the first activity or second activity is at least one of recording content, video display resolution, power of the apparatus, standby of the apparatus, and status of communication between the apparatus and another device.

8. The apparatus of claim 7, wherein the status of communication may include at least one of Ethernet link, Ethernet activity, Multimedia over Cable Alliance link, and Multimedia over Cable Alliance activity.

9. The apparatus of claim 1, wherein the apparatus is a communication receiver operating in at least one of an Ethernet network or a Multimedia over Cable Alliance network.

10. The apparatus of claim 1, wherein the apparatus is capable of receiving a broadcast signal from a broadcast service provider.

11. A method comprising:
providing a first signal to a first indicator light, the first signal indicating a status for a first activity in a device;
providing a second signal to a second indicator light, the second signal indicating a status for a second activity in the device; and
providing a third signal to the first indicator light and the second indicator light simultaneously and in parallel, the third signal adjusting a brightness of the first indicator light when the first indicator light is illuminated in response to indicating the status of the first activity and adjusting a brightness of the second indicator light when the second indicator light is illuminated in response to indicating the status of the second activity, wherein the third signal is one pulse width modulated signal that adjusts the brightness for the first indicator light using a first resistor and adjusts the brightness for the second indicator light using a second resistor.

12. The method of claim 11, wherein the third signal adjusts the brightness of the first indicator light and the brightness of the second indicator light based on a value selected by a user.

13. The method of claim 11, wherein the third signal adjusts the brightness of the first indicator light and the brightness of the second indicator light based on a current operating condition for the device.

14. The method of claim 11, wherein the third signal adjusts the brightness of the first indicator light and the brightness of the second indicator light based on at least one of the time of day, a current program being viewed by a user, receipt of a message on the apparatus, and whether the device is on or off.

15. The method of claim 14, wherein the third signal adjusts the brightness of the first indicator light and the brightness of the second indicator light to minimize awareness of at least one of the first indicator light and the second indicator light by a user or alternatively to draw attention to the first indicator light and the second indicator light by the user.

16. The method of claim 11, wherein the first signal indicates the status for the first activity by changing a signal level between a voltage level greater than zero volts and a voltage level equal to zero volts and the second signal indicates the status for the second activity by changing a signal level between a voltage level greater than zero volts and a voltage level equal to zero volts.

17. The method of claim 11, wherein the first and second activities are at least one of recording content, video display resolution, power of the device, standby of the device, and a status of communication between the device and another device.

18. The method of claim 17, where the status of communication may include at least one of Ethernet link, Ethernet activity, Multimedia over Cable Alliance link, and Multimedia over Cable Alliance activity.

19. The method of claim 11, wherein the device is a communication receiver operating in at least one of an Ethernet network or a MoCA network.

20. The method of claim 11, wherein the device is capable of receiving a broadcast signal from a broadcast service provider.

21. An apparatus comprising:
a first indicator light means;
a second indicator light means;
means for providing a first signal to the first indicator light means, the first signal indicating a status for a first activity;
means for providing a second signal to the second indicator light means, the second signal indicating a status for a second activity; and
means for providing a third signal to the first indicator light means and the second indicator light means simultaneously and in parallel, the third signal adjusting the brightness of the first indicator light means when the first indicator light means is illuminated in response to indicating the status of the first activity and adjusting the brightness of the second indicator light means when the second indicator light means is illuminated in response to indicating the status of the second activity, wherein the third signal is one pulse width modulated signal and adjusts the brightness for the first indicator light means using a first resistor and adjusts the brightness for the second indicator light means using a second resistor.

22. The apparatus of claim 21, wherein the means for providing the third signal adjusts the brightness of the first indicator light means and the brightness of the second indicator light means based on a value selected by a user.

23. The apparatus of claim 21, wherein the means for providing the third signal adjusts the brightness of the first indicator light means and the brightness of the second indicator light means based on a current operating condition for the apparatus.

24. The apparatus of claim 21, wherein the means for providing the third signal adjusts the brightness of the first indicator light means and the brightness of the second indicator light means based on at least one of the time of day, a current program being viewed by a user, receipt of a message on the apparatus, and whether the apparatus is on or off.

25. The apparatus of claim 24, wherein the means for providing the third signal further adjusts the brightness of the first indicator light means and the brightness of the second indicator light means to minimize awareness of at least one of the first indicator light means and the second indicator light means by a user or alternatively to draw attention to the first indicator light means and the second indicator light means by the user.

26. The apparatus of claim 21, wherein the means for providing the first signal indicates the status by changing a signal level between a voltage level greater than zero volts and a voltage level equal to zero volts and the second signal indicates the status by changing a signal level between a voltage level greater than zero volts and a voltage level equal to zero volts.

27. The apparatus of claim 21, wherein the first and second activities are at least one of recording content, video display resolution, power of the apparatus, standby of the apparatus, and status of communication between the apparatus and another device.

28. The apparatus of claim 27, where the status of communication may include at least one of Ethernet link, Ethernet activity, Multimedia over Cable Alliance link, and Multimedia over Cable Alliance activity.

29. The apparatus of claim 21, wherein the apparatus is a communication receiver operating in at least one of an Ethernet network or a MoCA network.

30. The apparatus of claim 21, wherein the apparatus is capable of receiving a broadcast signal from a broadcast service provider.

\* \* \* \* \*